（12）United States Patent
Rho et al.

(10) Patent No.: US 10,164,288 B2
(45) Date of Patent: Dec. 25, 2018

(54) FLEXIBLE BATTERY, MANUFACTURING METHOD THEREFOR, AND AUXILIARY BATTERY COMPRISING FLEXIBLE BATTERY

(71) Applicant: AMOGREENTECH CO., LTD., Gyeonggi-do (KR)

(72) Inventors: Seung Yun Rho, Gyeonggi-do (KR); Won Gil Choi, Gyeonggi-do (KR); Hyeon Woo Cho, Chungcheongnam-do (KR); Ju Hee Jang, Gyeonggi-do (KR); Hyeong Tak Noh, Seoul (KR); Jong Gwan Kim, Gyeonggi-do (KR)

(73) Assignee: AMOGREENTECH CO., LTD., Gyeonggi-do (KR)

( * ) Notice: Subject to any disclaimer, the term of this patent is extended or adjusted under 35 U.S.C. 154(b) by 23 days.

(21) Appl. No.: 15/508,685

(22) PCT Filed: Sep. 4, 2015

(86) PCT No.: PCT/KR2015/009340
§ 371 (c)(1),
(2) Date: Mar. 3, 2017

(87) PCT Pub. No.: WO2016/036184
PCT Pub. Date: Mar. 10, 2016

(65) Prior Publication Data
US 2017/0263972 A1 Sep. 14, 2017

(30) Foreign Application Priority Data

Sep. 5, 2014 (KR) .................... 10-2014-0119289
Feb. 26, 2015 (KR) .................... 10-2015-0027554

(51) Int. Cl.
*H01M 10/04* (2006.01)
*H01M 2/02* (2006.01)
(Continued)

(52) U.S. Cl.
CPC .......... *H01M 10/045* (2013.01); *H01M 2/02* (2013.01); *H01M 2/021* (2013.01); *H01M 2/026* (2013.01);
(Continued)

(58) Field of Classification Search
CPC .................................. H01M 10/3972
See application file for complete search history.

(56) References Cited

U.S. PATENT DOCUMENTS

2013/0101884 A1* 4/2013 Ueda ............... H01M 10/052
429/127
2013/0224562 A1* 8/2013 Momo ............ H01M 10/0436
429/149

FOREIGN PATENT DOCUMENTS

JP 2000173559 A 6/2000
JP 2006172773 A 6/2006
(Continued)

*Primary Examiner* — Scott J. Chmielecki
(74) *Attorney, Agent, or Firm* — Norton Rose Fulbright US LLP

(57) ABSTRACT

A flexible battery is disclosed, which comprises an electrode assembly, and an exterior material for sealing the electrode assembly along with an electrolyte. Both the electrode assembly and the exterior material are formed such that patterns for contraction and extension with respect to the longitudinal direction have the same directionality in the event of being bent.

20 Claims, 8 Drawing Sheets

(51) Int. Cl.
*H01M 4/13* (2010.01)
*H01M 2/16* (2006.01)
*H01M 10/0565* (2010.01)
*H01M 4/04* (2006.01)
*H01M 4/133* (2010.01)
*H01M 4/134* (2010.01)
*H01M 4/1393* (2010.01)
*H01M 4/1395* (2010.01)
*H01M 4/38* (2006.01)
*H01M 4/583* (2010.01)
*H01M 4/62* (2006.01)
*H01M 10/0525* (2010.01)
*H01M 10/39* (2006.01)
*H01M 4/02* (2006.01)
*H04B 1/3827* (2015.01)

(52) U.S. Cl.
CPC ....... *H01M 2/0275* (2013.01); *H01M 2/0287* (2013.01); *H01M 2/16* (2013.01); *H01M 2/162* (2013.01); *H01M 2/1686* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/38* (2013.01); *H01M 4/583* (2013.01); *H01M 4/623* (2013.01); *H01M 10/04* (2013.01); *H01M 10/0525* (2013.01); *H01M 10/0565* (2013.01); *H01M 10/3972* (2013.01); *H01M 2002/0205* (2013.01); *H01M 2004/025* (2013.01); *H01M 2220/30* (2013.01); *H01M 2300/0025* (2013.01); *H01M 2300/0085* (2013.01); *H04B 1/385* (2013.01)

(56) References Cited

FOREIGN PATENT DOCUMENTS

| | | |
|---|---|---|
| KR | 20020017973 A | 3/2002 |
| KR | 20140035689 A | 3/2014 |
| WO | WO 2007118281 A | 10/2007 |

\* cited by examiner

FLEXIBLE BATTERY, MANUFACTURING METHOD THEREFOR, AND AUXILIARY BATTERY COMPRISING FLEXIBLE BATTERY

CROSS-REFERENCE TO RELATED APPLICATIONS

This application is a national phase application under 35 U.S.C. § 371 of International Application No. PCT/KR2015/009340 filed Sep. 4, 2015, which claims priority to Korean Patent Application No. 10-2014-0119289 filed Sep. 4, 2015, and Korean Patent Application No. 10-2015-0027554 filed Feb. 20, 2015. The entire contents of each of the above-referenced disclosures are specifically incorporated herein by reference without disclaimer.

TECHNICAL FIELD

The present invention relates to a flexible battery, a manufacturing method thereof, and an auxiliary battery including the flexible battery.

BACKGROUND ART

With digitalization and high-performance of electronic products, as customer demands are changed, a flow of market demands has been changed to development of power supply devices having a thin type, a light weight, a high capacity due to high energy density.

In order to satisfy the customer demands, power supply devices such as a lithium ion secondary battery, a lithium ion polymer battery, and super capacitors (an electronic double layer capacitor and a pseudo capacitor) having a high energy density and a large capacity have been developed.

Recently, the demand for mobile electronic devices such as portable telephones, notebooks, and digital cameras is continuously increasing, and particularly, an interest in flexible mobile electronic devices applied with a rollable display, a flexible e-paper, a flexible liquid crystal display (flexible-LCD), a flexible organic light-emitting diode (flexible-OLED), and the like has been recently increased. Accordingly, it is required that a power supply device for the flexible mobile electronic device also have a flexible characteristic.

A flexible battery has been developed as one of the power supply devices capable of reflecting the characteristic.

The flexible battery may include a nickel-cadmium battery, a nickel-metal hydride battery, a nickel-hydrogen battery, a lithium-ion battery, and the like having a flexible property. Particularly, the lithium-ion battery has high availability due to high energy density per unit weight and quick charging compared to other batteries such as lead storage batteries, nickel-cadmium batteries, nickel-hydrogen batteries, and nickel-zinc batteries.

The lithium-ion battery uses a liquid electrolyte and has been mainly used in a welded form by using a metal can as a container. However, a cylindrical lithium-ion battery using the metal can as the container has a disadvantage of limiting designs of electric products because the form is fixed and it is difficult to reduce a volume.

Particularly, as described above, the mobile electronic device is developed to be thinned, small-sized, and flexible, and thus there is a problem in that the lithium-ion battery using the metal can in the related art or a battery having a rectangular structure is not easily applied to the mobile electronic device.

Accordingly, in order to solve the structural problem, recently, a pouch type battery used by putting an electrolyte in a pouch including two electrodes and a separator and sealing the electrolyte has been developed.

The pouch type battery is made of a flexible material to be manufactured in various forms and has an advantage of implementing high energy density per mass.

That is, as illustrated in FIG. 1, a pouch type battery 1 is provided in a form in which an electrode assembly 20 is sealed at the inside of the exterior material 10, and the exterior material 10 has a laminated structure of an inner resin layer, a metal layer, and an outer resin layer. Among them, the metal layer is a required constitute element of the exterior material for moisture-proof and the like, and the metal layer may not pass through moisture and an electrolyte due to a dense density to prevent moisture from penetrating to the inside of the exterior material from the outside of the exterior material and simultaneously, prevent the electrolyte positioned in the exterior material from being leaked to the outside of the exterior material.

However, since the metal layer hardly ensures flexibility at a predetermined level or more due to insufficient elastic resilience, there is a problem in that cracks are caused in the flexible battery using the exterior material.

Further, in some cases, the pouch type battery 1 is implemented in a flexible form to be applied to products. However, since the pouch type battery 1 in the related art is implemented in a simply flexible form, when repeated bending occurs in a using process, the exterior material and the electrode assembly are repetitively contracted and relaxed to be broken or the performance is significantly reduced compared to an initial design value, and thus there is a limit to exhibit a function as the battery.

SUMMARY OF THE INVENTION

The present invention has been made in an effort to solve the aforementioned problems, and an object of the present invention is to provide a flexible battery, a manufacturing method thereof, and an auxiliary battery and a mobile electronic device including the flexible battery, which can prevent occurrence of cracks even if bending occurs by predetermined patterns satisfying a condition according to the present invention which are formed on an exterior material and an electrode assembly, respectively.

Another object of the present invention is to provide a flexible battery, a manufacturing method thereof, and an auxiliary battery and a mobile electronic device including the flexible battery, which can prevent or minimize deterioration of a physical property required as a battery even if repeated bending occurs by matching the respective patterns formed on the exterior material and the electrode assembly with each other.

To solve the aforementioned problems, an aspect of the present invention provides a flexible battery comprising: an electrode assembly; and an exterior material for sealing the electrode assembly along with an electrolyte, in which the electrode assembly and the exterior material are formed so that patterns for contraction and extension with respect to a longitudinal direction have the same directionality in the event of being bent, and a region with the patterns includes a region in which an increased surface area ratio (Sdr) according to Equation 1 below satisfies 0.5 to 40.0:

$$\text{Increased surface area ratio}(Sdr) = \frac{\text{surface area of one region with pattern} - Lx \times Ly}{Lx \times Ly} \times 100 \qquad [\text{Equation 1}]$$

In this case, a surface area of one region with the patterns means a surface area based on one region of the battery in which a horizontal length is Lx (mm) and a vertical length is Ly (mm).

According to a preferred embodiment of the present invention, the patterns may include a first pattern formed on at least one surface of the exterior material and a second pattern formed on the electrode assembly in the same direction as the first pattern, and the first pattern and the second pattern may be disposed to be coincident with each other.

Further, in the pattern, a plurality of crest portions and trough portions may be alternately formed in a longitudinal direction and the crest portion and trough portion may be provided to have an arc-shaped cross-section, a polygonal cross-section, and a combined cross-section thereof.

The patterns may be entirely or partially formed in a longitudinal direction of the electrode assembly and the exterior material, and the crest portions and trough portions may be continuously or discontinuously formed in a parallel direction with a width direction of the electrode assembly and the exterior material, respectively.

In this case, a distance between a plurality of adjacent crest portions or a distance between a plurality of adjacent trough portions may be formed to have an equal distance or an unequal distance or provided in a form combined with the equal distance and the unequal distance, and the patterns may be continuously or discontinuously formed along the longitudinal direction.

Further, the exterior material may include a first region for forming an accommodating portion that accommodates the electrode assembly and an electrolyte, and a second region disposed to surround the first region to form a sealing portion, and the pattern formed on the exterior material of the patterns may be formed only in the first region.

Further, an increased surface area ratio (Sdr) according to Equation 1 may be 3.0 to 23.0.

Further, a cross-sectional thickness of the battery may be 0.2 to 5 mm.

Further, the electrode assembly may include a positive electrode and a negative electrode constituted by coating an active material on a part or the entire of a current collector and a separator disposed between the positive electrode and the negative electrode, and the separator may include a porous nonwoven layer having fine pores and a nanofiber web layer containing a polyacrylonitrile nanofiber on one surface or both surfaces of the nonwoven layer. In this case, the active material may include PTFE to prevent cracks and releasing from the current collector.

Further, in the exterior material, a first resin layer, a metal layer and a second resin layer may be sequentially laminated and the second resin layer may be exposed to the outside.

Further, the first resin layer may be formed in a single layer of one kind selected from acid modified polypropylene (PPa), casting polyproylene (CPP), linear low density polyethylene (LLDPE), low density polyethylene (LDPE), high density polyethylene (HDPE), polyethylene terephthalate, polypropylene, ethylene vinyl acetate (EVA), an epoxy resin and a phenol resin or by laminating two kinds or more thereof.

In this case, the first resin layer may have an average thickness of 20 μm to 80 μm, the metal layer may have a thickness of 5μm to 100 μm, and the second resin layer may have an average thickness of 10 μm to 50 μm.

Further, the metal layer may include at least one selected from aluminum, copper, phosphorbronze (PB), aluminum bronze, copper-nickel, beryllium-copper, chromium-copper, titanium-copper, iron-copper, a corson alloy and a chromium-zirconium copper alloy.

Further, the second resin layer may include at least one selected from nylon, polyethylene terephthalate (PET), cycloolefin polymer (COP), polyimide (PI), and a fluorine-based compound.

Further, the fluorine-based compound may include at least one selected from polytetrafluoroethylene (PTFE), perfluorinated acid (PFA), a fluorinated ethylene propylene copolymer (FEP), polyethylene tetrafluoroethylene (ETFE), polyvinylidene fluoride (PVDF), ethylene chlorotrifluoroethylene (ECTFE), and polychlorotrifluoroethylene (PCTFE).

Further, an adhesive layer may be disposed between the metal layer and the first resin layer and the adhesive layer may include at least one selected from silicon, polyphthalate, acid modified polypropylene (PPa) or acid modified polyethylene (PEa). In this case, the adhesive layer may have an average thickness of 5 μm to 30 μm.

Further, a dry lamination layer may be disposed between the metal layer and the second resin layer and the dry lamination layer may have an average thickness of 1 μm to 7 μm.

Further, the electrolyte may include a gel polymer electrolyte

Another aspect of the present invention provides a flexible battery including: an electrode assembly; and an exterior material sealing the electrode assembly with an electrolyte, in which the electrode assembly and the exterior material are formed so that patterns for contraction and extension with respect to a longitudinal direction have the same directionality in the event of being bent, and a region with the patterns includes a region in which θ according to Equation 2 below satisfies 5.0° to 47°:

$$\theta(°) = \tan^{-1}\left(\frac{2h}{p}\right) \qquad [\text{Equation 2}]$$

The h means an average vertical distance (mm) between the top and the bottom of adjacent crests and troughs in the pattern formed in the flexible battery and the p means an average horizontal distance (mm) between the tops of two adjacent crests.

According to a preferred embodiment of the present invention, a region with the patterns may include a region satisfying θ of 5.0° to 31° according to Equation 2.

Yet another aspect of the present invention provides an auxiliary battery including: the flexible battery described above; and a soft housing covering the surface of the exterior material, in which the housing includes at least one terminal portion for electric connection with a device to be charged.

Still another aspect of the present invention provides a mobile electronic device including the auxiliary battery described above.

According to the present invention, the patterns for contraction and extension with respect to the longitudinal direction are formed on both the exterior material and the electrode assembly to prevent cracks from being generated even if the bending occurs, thereby ensuring physical properties required as the battery.

Further, the patterns formed on the exterior material and the electrode assembly are formed to be matched with each other to prevent or minimize deterioration of physical properties required as the battery even if the repeated bending occurs.

Therefore, the present invention is applicable not only to wearable devices such as smart watches and watch straps, but also to various electronic devices, such as rollable displays, which require battery flexibility to be secured.

DESCRIPTION OF DRAWINGS

FIG. 1 is a diagram illustrating a battery in the related art, in which FIG. 1A is an overall schematic diagram and FIG. 1B is a cross-sectional view.

DETAILED DESCRIPTION OF THE INVENTION

Figure 1:
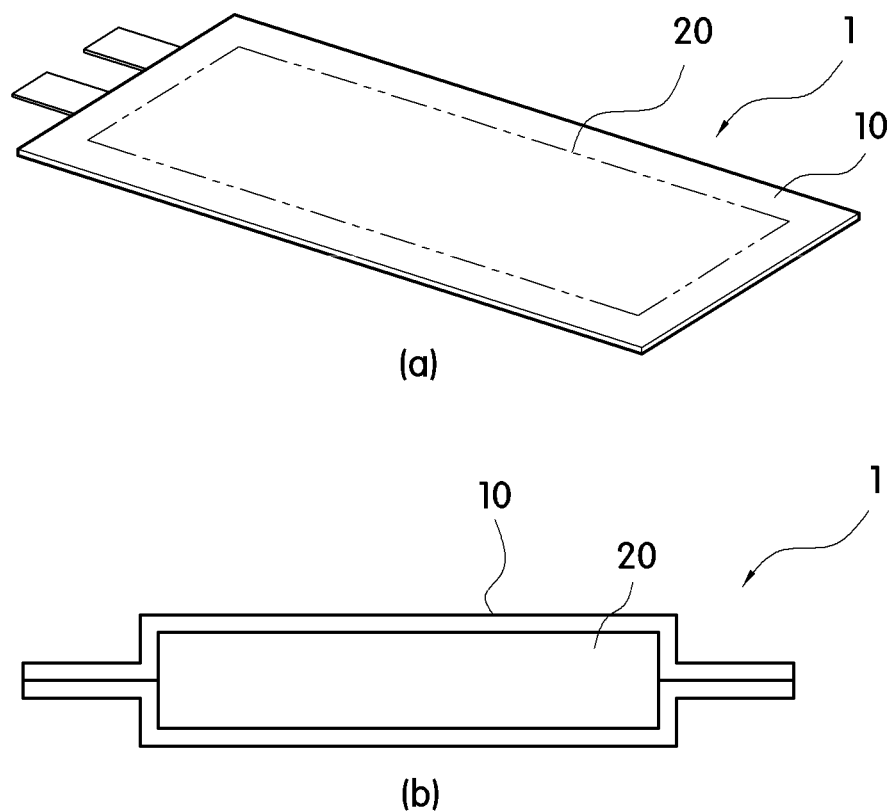

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
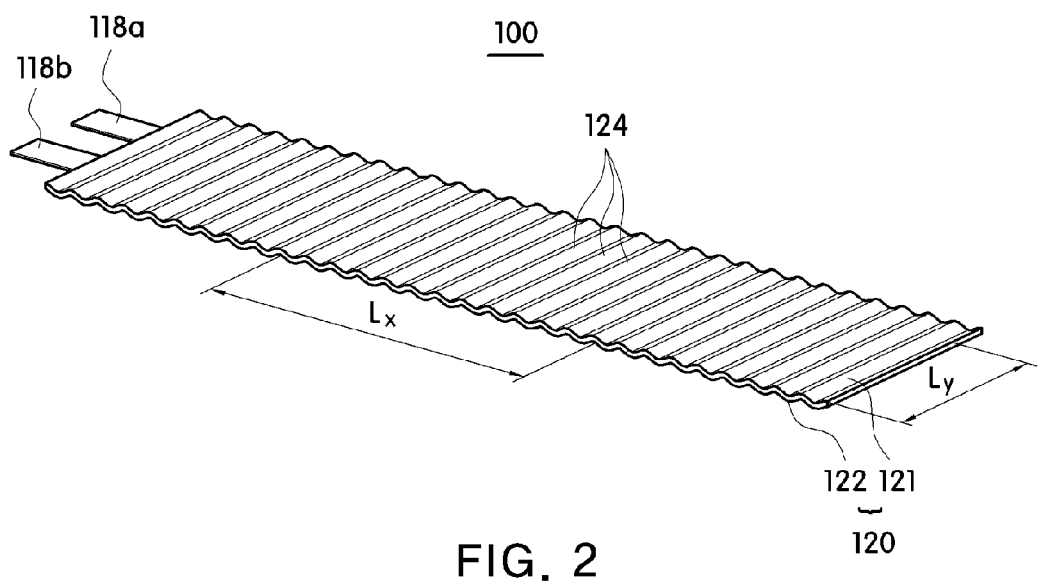
FIG. 2 is an overall schematic diagram illustrating a flexible battery according to an embodiment of the present invention.
Figure 3:
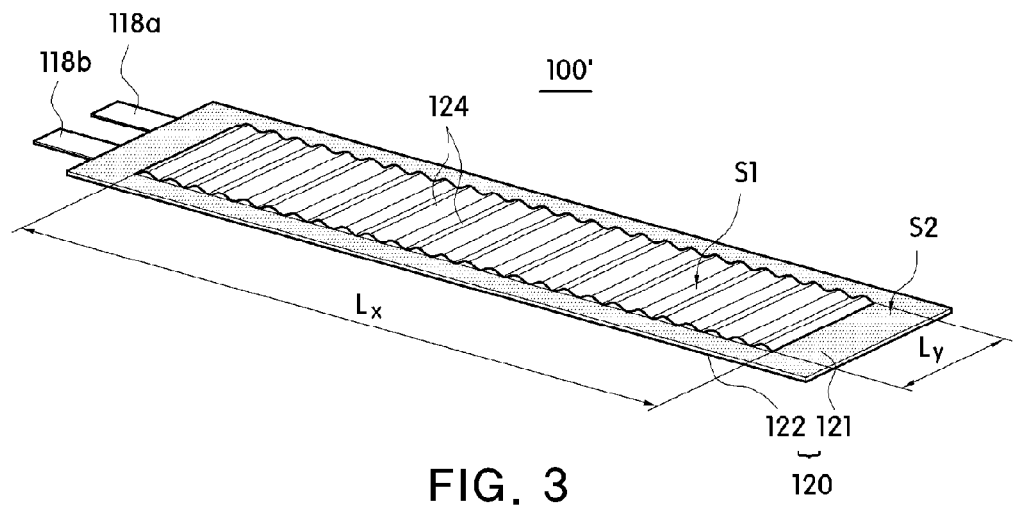
FIG. 3 is an overall schematic diagram illustrating a flexible battery according to another embodiment of the present invention, in which a first pattern is formed only at a receiving part of an exterior material.

A flexible battery 100 according to an embodiment of the present invention includes an electrode assembly 110 and an exterior material 120 as illustrated in FIGS. 2 and 3, and the electrode assembly 110 is sealed in the exterior material 120 along with an electrolyte.

In this case, the electrode assembly 110 and the exterior material 120 according to the present invention include patterns 119 and 124 for contraction and extension with respect to a longitudinal direction in the event of being bent, respectively, and a first pattern 124 formed on the exterior material 120 and a second pattern 119 formed on the electrode assembly 110 are provided to have the same directionality.

These patterns 119 and 124 offset a length change amount caused by a change in curvature at a bent portion of the flexible battery 100 in the event of being bent to prevent or minimize a substrate itself from being contracted or extended.

As a result, since a change amount of the substrate itself configuring the electrode assembly 110 and the exterior material 120 is prevented or minimized, the change amount of the substrate itself capable of locally occurring at the bent portion even if the repeated bending occurs is minimized, thereby preventing the electrode assembly 110 and the exterior material from being locally damaged by bending or performance from being deteriorated.

In this case, the first pattern 124 and the second pattern 119 are disposed such that the first pattern 124 and the second pattern 119 have the same directionality and are coincident with each other. The reason is to allow the first pattern 124 and the second pattern 119 to always behave equally, thereby enabling the first pattern 124 and the second pattern 119 to always maintain initial states thereof even though the flexible battery 100 returns back to the original state after being bent.

Figure 11A:
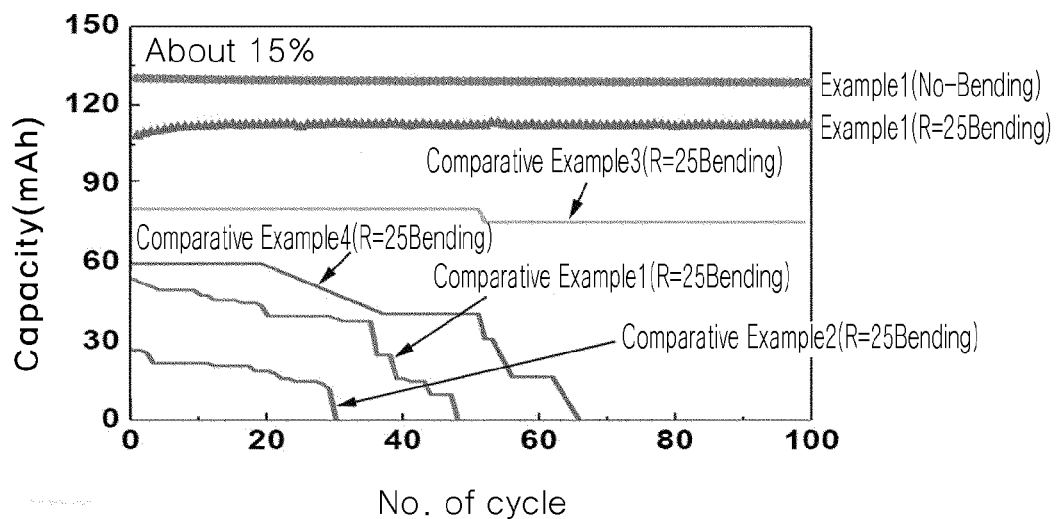
FIG. 11A is a graph illustrating performance of the flexible battery according to the exemplary embodiment of the present invention, that is, a graph illustrating a change in battery capacity before and after the flexible battery is bent.
Figure 11B:
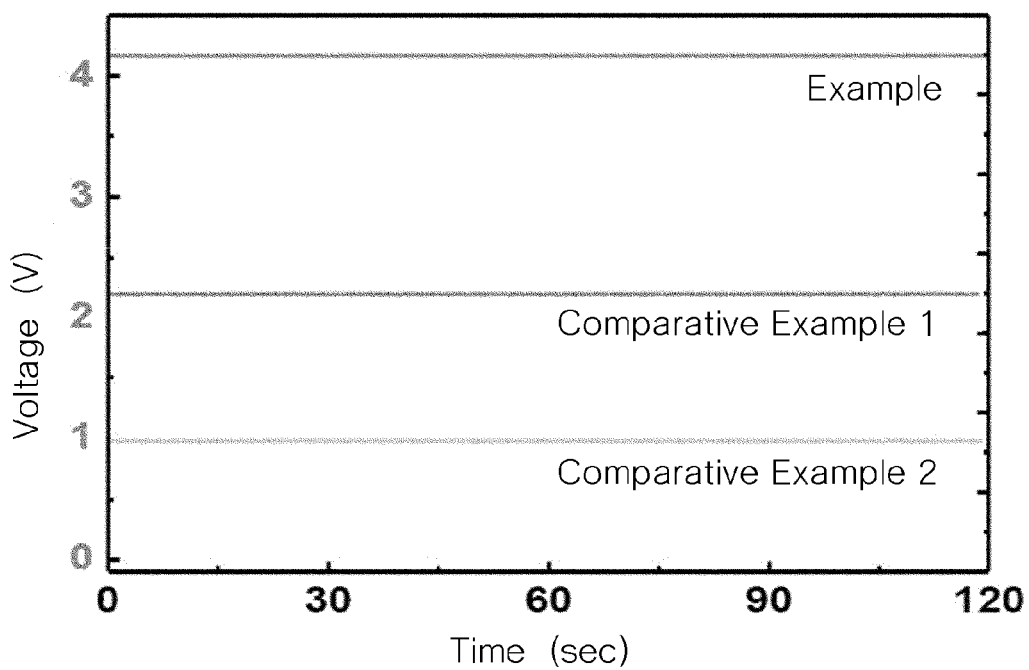
FIG. 11B is a graph illustrating performance of the flexible battery according to the exemplary embodiment of the present invention, that is, a graph illustrating a change in voltage of the battery with respect to time when instantaneous external force is applied to a bent portion.

These performance can be seen from graphs of FIGS. 11A and 11B.

That is, as illustrated in FIG. 11A, it can be seen that under an environment with a temperature of 25° C. and humidity of 65%, when the flexible battery is bent by applying force to both end portions of the flexible battery so that a curvature of a bent portion is 25 mm and the flexible battery is charged and discharged 100 times, it was verified that in the case of flexible batteries 100 and 100' according to the present invention, a capacity of 116 mAh decreased by approximately 15% compared to a capacity of 135 mAh without bending is shown and the performance is maintained even if the charging and discharging are performed 100 times (Example 1). However, it was verified that in the case of a flexible battery forming patterns for contraction and extension only at the exterior material, performance slowly decreased at a capacity of 52 mAh decreased by approximately 60% compared to the initial capacity is shown and the charging and discharging are impossible beyond 50 times (Comparative Example 1), and in the case of a flexible battery provided in a simple plate form without forming the patterns on both the exterior material and the electrode assembly, a decrease of a capacity of 26 mAh decreased by approximately 80% compared to the initial capacity occurs and the charging and discharging are impossible beyond 30 times (Comparative Example 2).

Meanwhile, as a result of measuring voltage in the battery over time after the middle of the length of the flexible battery is fully folded and then restored to the original state in an environment of a temperature of 25° C. and a humidity of 65%, as illustrated in FIG. 11B, it was verified that in the case of the flexible batteries 100 and 100' according to the present invention, a change in voltage value is not generated (Example 1), but in the case of the flexible battery with the pattern for contraction and extension only on the exterior material (Comparative Example 1) and the flexible battery provided in the simple plate form without forming the patterns on both the exterior material and the electrode assembly (Comparative Example 2), deterioration of the voltage value occurs.

In other words, it is verified that in the case where the patterns 119 and 124 for contraction and extension on the exterior material 120 and the electrode assembly 110 are formed to match each other, deterioration of the performance is not largely generated even if the bending occurs, whereas in the case where the pattern is formed only on the exterior material or the patterns are not formed on both the exterior material and the electrode assembly, the cracks are generated by bending or deterioration of performance as the battery is generated by generating leakage of the electrolyte.

As such, in the flexible batteries 100 and 100' according to the present invention, the patterns 119 and 124 for contraction and extension with respect to the longitudinal direction in the event of being bent are formed on the electrode assembly 110 and the exterior material 120 to match each other and thus the electrode assembly 110 and the exterior material 120 may always maintain an uniform distance or a contact state with respect to the entire length even if the bending occurs. Accordingly, the electrolyte sealed with the electrode assembly 110 is uniformly distributed with respect of the entire length to prevent the performance of the battery from being deteriorated.

To this end, in the first pattern 124 and the second pattern 119, respective crest portions and trough portions are formed in a parallel direction to a width direction of the exterior material 120 and the electrode assembly 110 and disposed alternately in the longitudinal direction of the exterior material 120 and the electrode assembly 110. Further, the crest portions and the trough portions configuring the first pattern 124 and the second pattern 119 are formed at the same positions as each other, respectively, and thus the first pattern 124 and the second pattern 119 are matched with each other.

In detail, the crest portions and the trough portions of the first pattern 124 and the second pattern 119 are formed in a parallel direction to a straight line parallel to the width direction of the exterior material 120 and the electrode assembly 110 and the crest portions and the trough portions are repetitively disposed in the longitudinal direction (see FIGS. 2 and 3).

Figure 4:
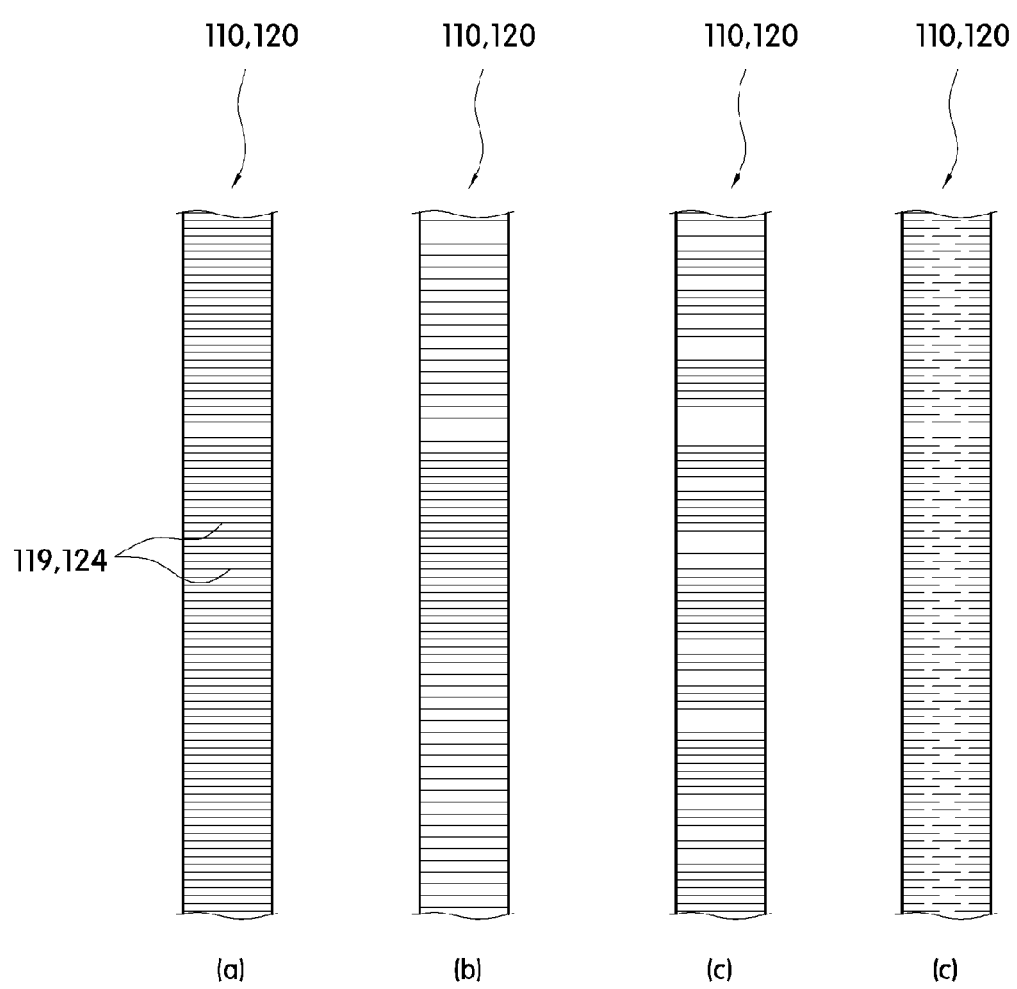
FIG. 4 is an exemplary diagram illustrating various patterns applied to an electrode assembly and an exterior material in the flexible battery according to the embodiment of the present invention, and a diagram illustrating various distances between trough portions or crest portions adjacent to each other.
Figure 5:
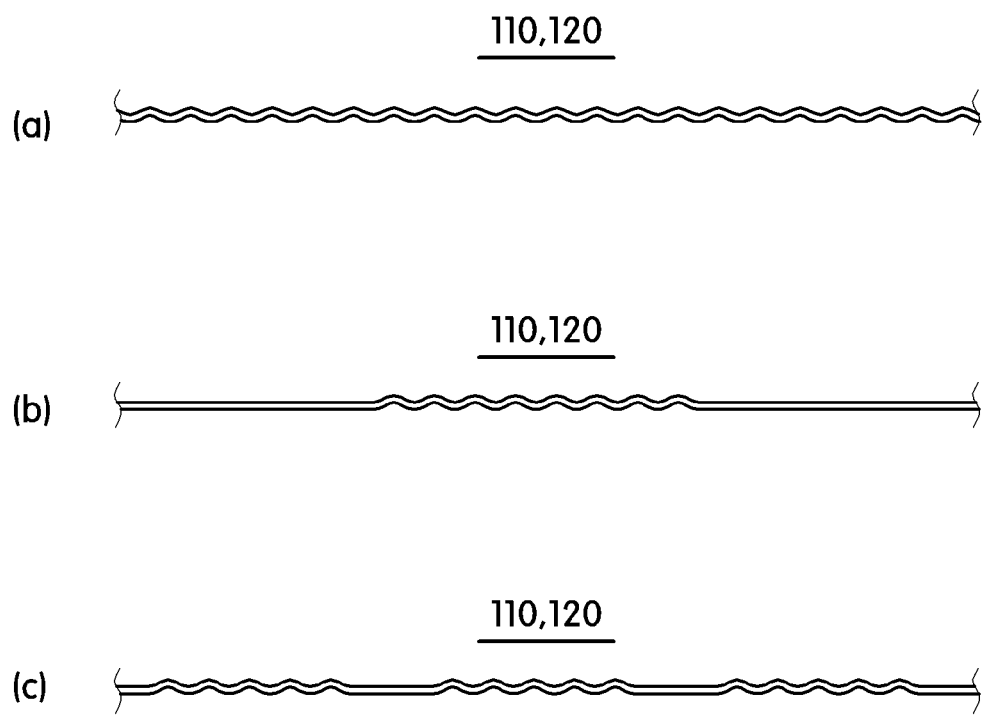
FIG. 5 is an exemplary diagram illustrating various patterns applied to an electrode assembly and an exterior material in the flexible battery according to the embodiment of the present invention, and an exemplary diagram illustrating a case where patterns are continuously or discontinuously with respect to the entire length.
Figure 6:
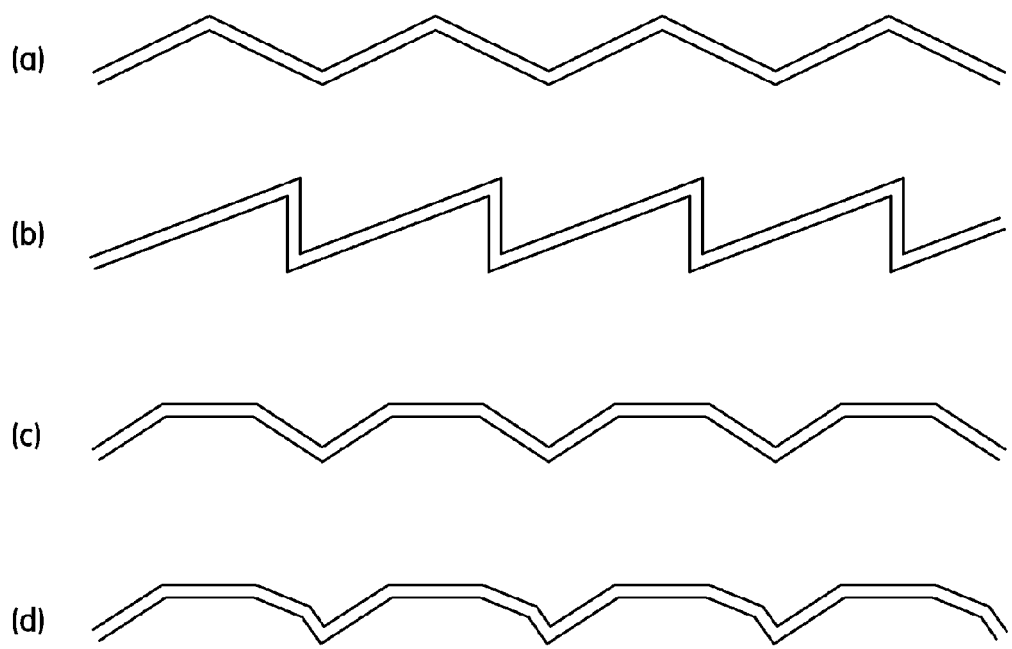
FIGS. 6 to 9 are schematic diagrams illustrating various cross-sectional shapes of the patterns applied to the flexible battery according to the embodiment of the present invention.
Figure 7:
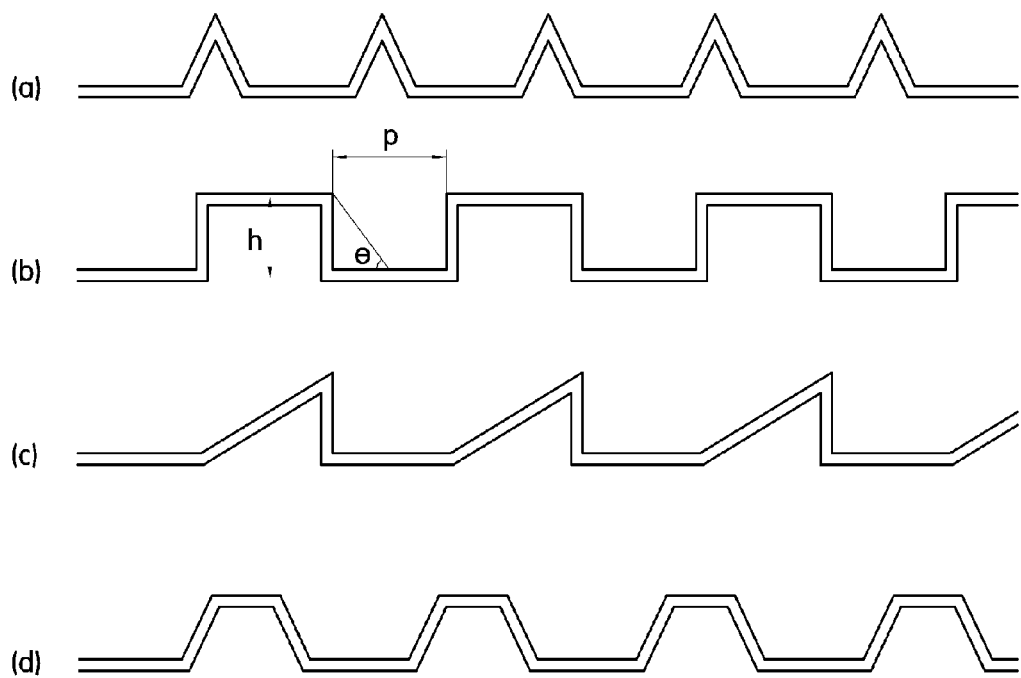
Figure 8:
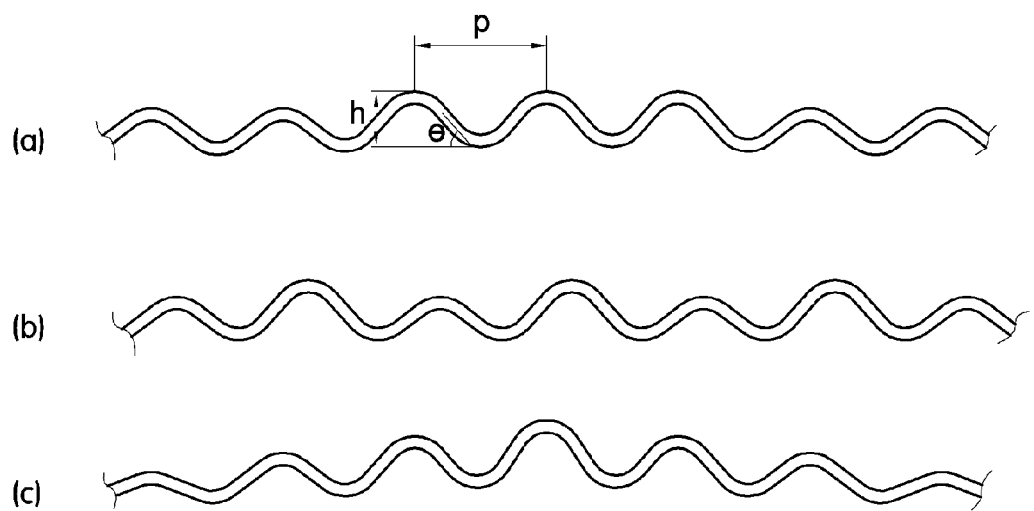
Figure 9:
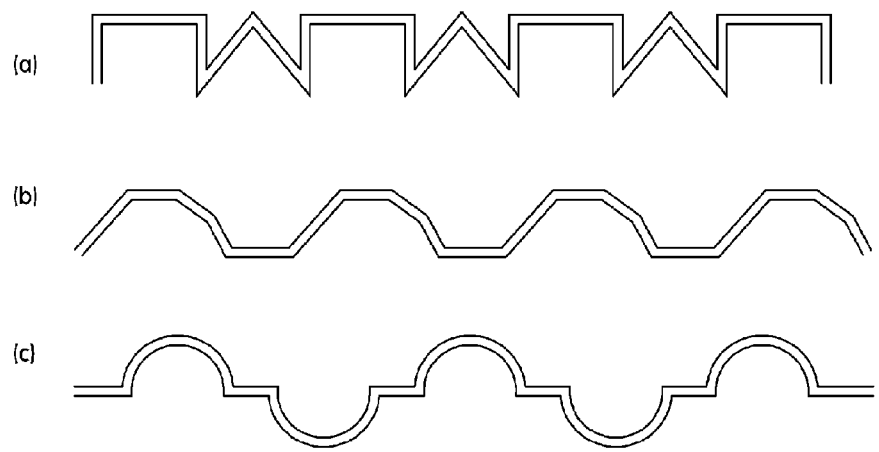

In this case, the patterns 119 and 124 may be continuously or discontinuously formed in a parallel direction to the width direction of the electrode assembly 110 and the exterior material 120 (see FIG. 4) and may be formed with respect to the entire length of the electrode assembly 110 and the exterior material 120 or partially formed with a part of the length (see FIG. 5).

Herein, the crest portions and the trough portions may be provided to have cross sections having various shapes such as an arc-shaped cross section including a semi-circular cross section, a polygonal cross section including a triangular or quadrangular cross section, and a combination of an arc-shaped cross section and a polygonal cross section, and each of the crest portion and the trough portion may be provided to have the same pitch and the same width, but may be provided to have different pitches and different widths (see FIGS. 6 to 9).

Accordingly, even though the exterior material 120 and the electrode assembly 110 are repeatedly contracted and extended in the longitudinal direction as the flexible battery is repeatedly bent, it is possible to reduce a degree of fatigue of the substrate itself because a change amount of contraction and extension is cancelled out by the patterns 119 and 124.

Meanwhile, as illustrated in FIG. 4, the first pattern 124 and the second pattern 119 may be formed such that the intervals between the neighboring crest portions are equal to or different from each other or the intervals between the neighboring trough portions are equal to or different from each other, or the same interval and different intervals may be combined.

As an example, in a case in which the flexible battery 100 or 100' according to the present invention is applied to a product such as a watch strap, the intervals between the crest portions and the trough portions, which constitute the patterns 119 and 124, may be equal to each other over the overall length, but the intervals between the crest portions and the trough portions formed at one side of a coupling portion, which is relatively frequently bent during a process of fastening or unfastening the watch strap, may be narrow, such that a change amount of contraction and extension of the coupling portion, which is cancelled out by the patterns 119 and 124, may be relatively larger than those of other portions.

Further, the first pattern 124 formed on the exterior material 120 may be formed on the entire surface of the exterior material 120, but may also be partially formed on the entire surface of the exterior material 120.

As an example, as illustrated in FIG. 3, in the flexible battery 100' according to the present invention, the first pattern 124 may be formed only in a first region S1 which defines an accommodating portion for accommodating the electrode assembly 110 and the electrolyte.

The reason is that no first pattern 124 is formed in a second region S2 which constitutes a sealing portion for preventing the electrolyte from leaking to the outside, thereby eliminating a likelihood of the electrolyte moving along the first pattern 124, and improving airtightness by increasing joining force between a first exterior material 121 and a second exterior material 122.

It is noted that in a case in which the first pattern 124 is formed only in the first region S1, the first pattern 124 may be formed over an overall area of the first region S1, or may be formed only in a region having an area corresponding to an area of the electrode assembly 110.

In this case, the region with the patterns 119 and 124 provided on the electrode assembly 110 and the exterior material 120 according to the present invention includes a region satisfying a surface area ratio Sdr of 0.5 to 40.0 increased according to the following Equation 1. As a result, cracks of the exterior material and/or the electrode assembly generated in frequent bending, twisting, and restoring processes are prevented, more improved flexibility may be expressed, and noise generated by collision between the crest portions or the trough portions in the event of being bent is prevented.

$$\text{Increased surface area ratio}(Sdr) = \frac{\text{surface area of one region with pattern} - Lx \times Ly}{Lx \times Ly} \times 100 \quad \text{[Equation 1]}$$

In Equation 1, Lx and Ly mean horizontal and vertical lengths of one region formed with the patterns as illustrated in FIGS. 2 and 3, and the one region may correspond to only a part of the region of the flexible battery with the patterns illustrated in FIG. 2 and correspond to the entire region of the flexible battery with the pattern illustrated in FIG. 3.

Further, in this case, the surface area of one region of the flexible battery with the pattern means a surface area of the corresponding region when horizontal and vertical lengths in one region with the patterns are Lx and Ly, respectively. That is, if the flexible battery is flat without forming the patterns, the increased surface area ratio by Equation 1 becomes 0, and as a height of the pattern is large and a pitch of the pattern is decreased, the increased surface area ratio may be increased, and the degree of the height and/or pitch of the pattern included in a predetermined region may be determined by the increased surface area ratio.

The flexible battery according to the present invention includes a pattern region satisfying a parameter value of 0.5 to 40.0 of the increased surface area ratio Sdr described above, preferably 1.8 to 30.0 and more preferably 3.0 to 23.0 to easily implement a desired property. If the increased surface area ratio is less than 0.5, flexibility of the battery is significantly deteriorated and thus the battery is not bent well in the event of being bent and may not be suitable for the flexible battery, and cracks in the exterior material, that is, a metal layer of the exterior material and/or the electrode assembly may be generated by repetition of bending/restoring of the battery, and thus there is a fatal problem in that durability of the battery is largely deteriorated or performance of the battery itself can be lost. Further, if the increased surface area ratio is more than 40.0, noise is generated in the event of being bent to give displeasure to the user, and thus it is difficult to be actually sold as a product, the tactile that the exterior material and/or the electrode assembly is broken during bending is felt, and in severe cases, the cracks in the metal layer of the exterior material and/or the electrode assembly may be generated to largely deteriorate durability of the flexible battery or loss the function.

Meanwhile, even though the flexible battery partially or entirely has the patterns, a pattern region which does not satisfy the increased surface area ratio according to the present invention may be included in a partial region of the portion with the patterns. When the battery is bent, different compressive force/tensile force may be applied to each position of the battery and a part having high compressive force/tensile force needs to satisfy the increased surface area ratio according to the present invention to obtain flexibility at a desired level. On the contrary, since a part having low compressive force/tensile force has relatively small external force to be endured by the metal layer of the exterior material and/or the electrode assembly, even though the pattern for ensuring the flexibility are formed, the increased surface area ratio of the corresponding part may not satisfy a value of Equation 1 according to the present invention.

Further, the region with the patterns 119 and 124, respectively, provided on the electrode assembly 110 and the exterior material 120 according to the present invention includes a region satisfying θ of 5.0° to 47° according to Equation 2 below and preferably 5.0° to 31°. As a result, the flexible battery according to the embodiment of the present invention may prevent cracks of the exterior material and/or the electrode assembly capable of being generated in frequent bending, twisting and restoring processes and express more improved flexibility, and noise generated by collision between the crests or between the troughs and the like is prevented in the event of being bent to prevent displeasure due to the noise to the user.

$$\theta(°) = \tan^{-1}\left(\frac{2h}{p}\right) \quad \text{[Equation 2]}$$

In Equation 2, referring to FIGS. 7B and 8A, h corresponds to an average height of the pattern formed in the flexible battery and means an average vertical distance (mm) between the top and the bottom of adjacent crests and troughs.

Further, p means an average horizontal distance (mm) between the tops of two adjacent crests. The degree of the height and/or the pitch of the pattern included in the predetermined region may be determined by a θ value of Equation 2.

The flexible battery according to the present invention includes a pattern region satisfying the θ value of 5 to 47° according to Equation 2 described above and preferably 5 to 31° and thus it is easy to implement a desired physical property. If the θ is less than 5°, there are problems in that flexibility of the battery is largely deteriorated and thus the cracks may be generated at the metal layer of the exterior material or the electrode assembly in bending, twisting and restoring processes, and the battery with the cracks may not implement desired physical properties of the battery such as largely deteriorating the performance of the battery or losing the battery function. Further, if the θ is more than 47°, there are problems in that while a pattern having a height and a pitch is formed on the battery, the cracks may be generated in the battery, a distance between adjacent crests is decreased in the pattern, when the battery is bent by implementing the pattern with the increased height, adjacent crests or adjacent troughs contact each other to prevent bending and the noise is generated and thus desired physical properties of the flexible battery may not be implemented.

Meanwhile, even though the flexible battery partially or entirely has the patterns, a pattern region which does not satisfy the θ value of Equation 2 according to the present invention may be included in a partial region of the portion with the patterns. When the battery is bent, different compressive force/tensile force may be applied to each position of the battery and a part having high compressive force/tensile force needs to satisfy the increased surface area ratio according to the present invention to obtain flexibility at a desired level. On the contrary, since a part having low compressive force/tensile force has relatively small external force to be endured by the metal layer of the exterior material and/or the electrode assembly, even though the pattern for ensuring the flexibility are formed, the θ value of Equation 2 according to the present invention of the corresponding part may deviate from 5.0 to 47°.

Further, a height h of the pattern included in the embodiment of the present invention may be 0.072 to 1.5 mm and an average horizontal distance p between the tops of two crests may be 0.569 to 1.524 mm, but is not limited thereto and may vary according to a detailed shape of the formed pattern.

Figure 10:
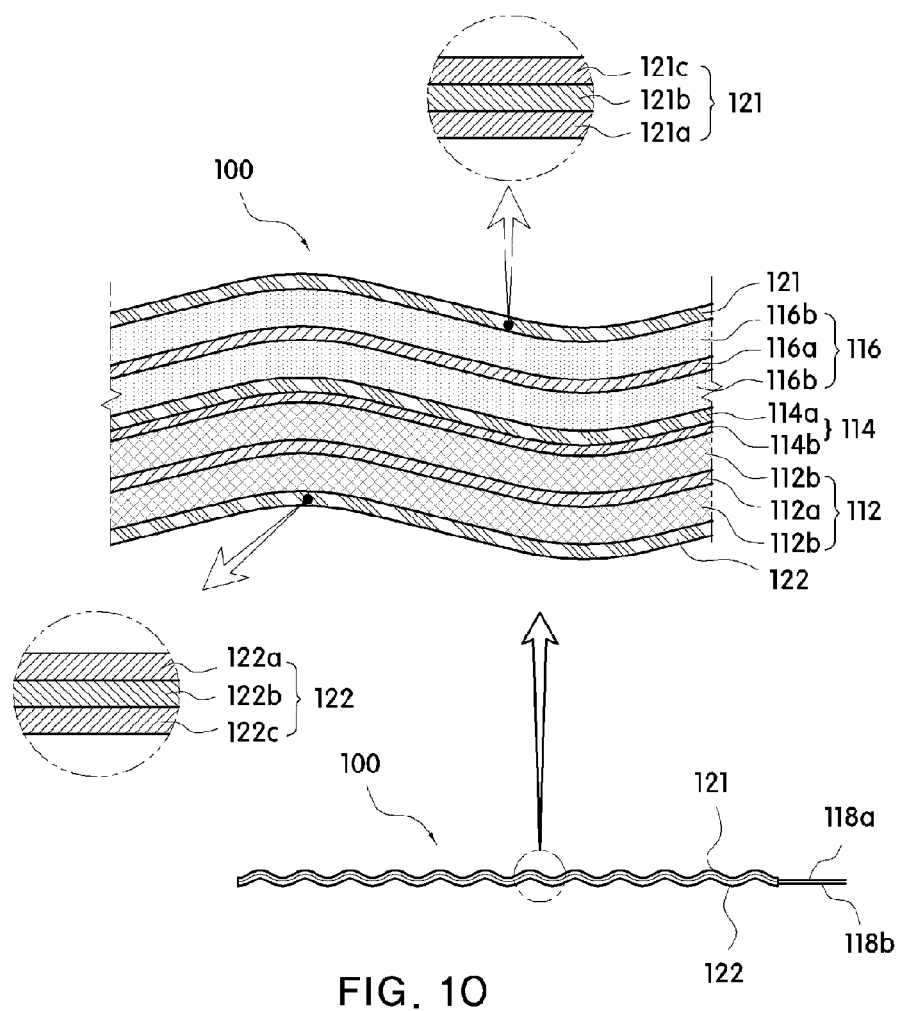
FIG. 10 is an enlarged diagram illustrating a detailed configuration of the flexible battery according to the embodiment of the present invention.

Meanwhile, the electrode assembly 110 is sealed together with the electrolyte in the exterior material 120 and includes a positive electrode 112, a negative electrode 116, and a separator 114, as illustrated in FIG. 10.

The positive electrode 112 includes a positive current collector 112a and a positive active material 112b and the negative electrode 116 includes a negative current collector 116a and a electrode active material 116b, and the positive current collector 112a and the negative current collector 116a may be implemented in a plated sheet form having a predetermined area.

That is, in the positive electrode 112 and the negative electrode 116, the active materials 112b and 116b may be compressed, deposited, or coated on one surface or both surfaces of the current collectors 112a and 116a, respectively. In this case, the active materials 112b and 116b may be provided with respect to the entire area of the current collectors 112a and 116a or partially provided with respect to the partial area.

Here, the negative electrode current collector 116a and the positive electrode current collector 112a may be formed of a thin metallic foil, and may be made of copper, aluminum, stainless steel, nickel, titanium, chromium, manganese, iron, cobalt, zinc, molybdenum, tungsten, silver, gold, and a mixture thereof.

In addition, the positive electrode current collector 112a and the negative electrode current collector 116a may be formed with a negative electrode terminal 118a and a positive electrode terminal 118b, respectively, so as to be electrically connected to an external device from bodies of the positive electrode current collector 112a and the negative electrode current collector 116a. Here, the positive electrode terminal 118b and the negative electrode terminal 118a may be provided to extend from the positive electrode current collector 112a and the negative electrode current collector 116a, respectively, and protrude from one side of the exterior material 120, or may be provided to be exposed from a surface of the exterior material 120.

Meanwhile, the positive electrode active material 112b includes a positive electrode active material which may reversibly perform intercalation and deintercalation on lithium ions, and as a representative example of the positive electrode active material, one of lithium-transition metal oxide such as $LiCoO_2$, $LiNiO_2$, $LiNiCoO_2$, $LiMnO_2$, $LiMn_2O_4$, $V_2O_5$, $V_6O_{13}$, $LiNi_{1-x-y}Co_xM_yO_2$ ($0 \leq x \leq 1$, $0 \leq y \leq 1$, $0 \leq x+y \leq 1$, M is a metal such as Al, Sr, Mg, and La) and an NCM (lithium nickel cobalt manganese) based active material may be used, and a mixture in which one or more of these materials are mixed may be used.

In addition, the negative electrode active material 116b includes a negative electrode active material which may reversibly perform intercalation and deintercalation on lithium ions, and the negative electrode active material may be selected from a group consisting of crystalline or amorphous carbon, carbon fiber, or a carbon-based negative electrode active material of a carbon composite, tin oxide, a lithiated material thereof, lithium, lithium alloy, and a mixture in which one or more of these materials are mixed.

Here, carbon may be one or more materials selected from a group consisting of a carbon nanotube, a carbon nanowire, a carbon nanofiber, graphite, active carbon, graphene pin, and graphite.

However, the positive electrode active material and the negative electrode active material used in the present invention are not limited thereto and it is identified that the positive electrode active material and the negative electrode active material used generally may be used.

In this case, in the present invention, a polytetrafluoroethylene (PTFE) component may be contained in the positive electrode active material 112b and the negative electrode active material 116b. This is to prevent the positive electrode active material 112b and the negative electrode active material 116b from being released from the current collectors 112a and 116b or cracks from be generated in the event of being bent.

The content of the PTFE component may be 0.5 to 20 wt %, preferably 5 wt % or less with respect to a total weight of each of the positive active material 112b and the negative active material 116b.

Meanwhile, the separator 114 disposed between the positive electrode 112 and the negative electrode 116 may include a nanofiber web layer 114b on one surface or both surfaces of a nonwoven layer 114a.

Herein, the nanofiber web layer 114b may be a nanofiber containing at least one selected from a polyacrylonitrile nanofiber and a polyvinylidene fluoride nanofiber.

In particular, the nanofiber web layer 114b may be made of only the polyacrylonitrile nanofiber in order to ensure spinnability and uniformly form pores. Here, an average diameter of the polyacrylonitrile nanofiber may be 0.1 to 2 μm, particularly, 0.1 to 1.0 μm.

The reason is that it is impossible to ensure sufficient heat resistance of the separator if an average diameter of the polyacrylonitrile nanofiber is smaller than 0.1 μm, and if the average diameter of the polyacrylonitrile nanofiber is greater than 2 μm, mechanical strength of the separator is excellent, but elastic force of the separator may be decreased.

Further, the separator 114 may use a complex porous separator to optimize an impregnating property of a gel polymer electrolyte when the gel polymer electrolyte is used as the electrolyte.

That is, the complex porous separator may include a porous non-woven fabric which is used as a matrix and has fine pores, and a porous nanofiber web which is made of a spinnable polymeric material and is impregnated with the electrolyte.

Herein, the porous nonwoven fabric is formed of a PP nonwoven fabric, a PE nonwoven fabric, a nonwoven fabric made of a PP/PE fiber having a dual structure coated with PE on the outer circumference of the PP fiber as a core, and a triple structure of PP/PE/PP, and may use any one of a nonwoven fabric having a shutdown function by PE having a relatively low melting point, a PET nonwoven fabric made of a polyethylene terephthalate (PET) fiber, or a nonwoven fabric made of a cellulose fiber. In addition, the PE nonwoven fabric may have a melting point of 100 to 120° C., the PP nonwoven fabric may have a melting point of 130 to 150° C., and the PET nonwoven fabric may have a melting point of 230 to 250° C.

In this case, in the porous nonwoven fabric, a thickness may be set in a range of 10 to 40 μm, a porosity may be set to 5 to 55%, and a Gurley value may be set to 1 to 1,000 sec/100c.

Meanwhile, the porous nanofiber web may use a swellable polymer which is swelled in the electrolyte alone or use a mixed polymer in which the swellable polymer is mixed with a heat-resistant polymer capable of reinforcing heat resistance.

As such, the porous nanofiber web is formed by dissolving a single or mixed polymer in a solvent to form a radioactive solution, spinning a spinning solution by an electrospinning device to accumulate the spun nanofiber in a collector, and having a 3D porous structure.

Herein, the porous nanofiber web may use any polymer capable of forming a nanofiber which is dissolved in the solvent to form a spinning solution and spun by an electrospinning method. For example, the polymer may be a single polymer or a mixed polymer and may use a swellable polymer, a non-swellable polymer, a heat-resistant polymer, a mixed polymer in which the swellable polymer and the non-swellable polymer are mixed, a mixed polymer in which the swellable polymer and the heat-resistant polymer are mixed, or the like.

In this case, when the porous nanofiber web uses a mixed polymer of the swellable polymer and the non-swellable polymer (alternatively, the heat-resistant polymer), the swellable polymer and the non-swellable polymer may be mixed with a weight ratio of 9:1 to 1:9 and preferably 8:2 to 5:5.

Generally, in the case of the non-swellable polymer, generally, many heat-resistant polymers are used, and as compared with the swellable polymer, a molecular weight is large and thus a melting point is relatively high. Accordingly, the non-swellable polymer may be a heat-resistant polymer having a melting point of 180° C. or more and the swellable polymer may be a resin having a melting point of 150° C. or less and preferably in a range of 100 to 150° C.

Meanwhile, the swellable polymer usable in the present invention is a resin which is swellable in the electrolyte and may be used as an ultrafine nanofiber by an electrospinning method.

For example, the swellable polymer may use polyvinylidene fluoride (PVDF), poly (vinylidene fluoride-co-hexafluoropropylene), perfluoropolymer, polyvinyl chloride or polyvinylidene chloride, and copolymers thereof, polyethylene glycol derivatives containing polyethylene glycol dialkyl ether and polyethylene glycol dialkyl ester, polyoxides including poly(oxymethylene-oligo-oxyethylene), polyethylene oxide and polypropylene oxide, polyvinyl acetate, polyacrylonitrile copolymers including poly(vinylpyrrolidone-vinyl acetate), polystyrene, a polystyrene acrylonitrile copolymer, and a polyacrylonitrile methyl methacrylate copolymer, polymethyl methacrylate, a polymethyl methacrylate copolymer, and mixtures mixed with at least one thereof.

Further, the heat-resistant polymer and the non-swellable polymer may be dissolved in an organic solvent for electrospinning and slowly swelled or not swelled by the organic solvent included in an organic electrolyte compared with a swellable polymer, and a resin having a melting point of 180° C. or more may be used.

For example, the heat-resistant polymer or the non-swellable polymer may use aromatic polyesters such as polyacrylonitrile (PAN), polyamide, polyimide, polyamideimide, poly(meta-phenylene isophthalamide), polysulfone, polyether ketone, polyethylene terephthalate, polytrimethylene terephthalate, and polyethylene naphthalate, polyphosphazenes such as polytetrafluoroethylene, polydiphenoxyphospazene, poly {bis[2-(2-methoxyethoxy)phosphazene]}, a polyurethane copolymer including polyurethane and polyetherurethane, cellulose acetate, cellulose acetate butyrate, cellulose acetate propionate, and the like.

Meanwhile, the nonwoven fabric configuring the nonwoven fabric layer 114a may use at least one selected from cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), polymethylmethacrylate (PMMA), and polyacrylonitrile.

Herein, the nonwoven fabric layer may further include an inorganic additive and the inorganic additive may include at least one selected from $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SiO_2$, $Al_2O_3$ and PTFE.

In addition, inorganic particles as the inorganic additive may be an average particle size of 10 to 50 nm, preferably 10 to 30 nm, and more preferably 10 to 20 nm.

Further, an average thickness of the separator may be 10 to 100 μm and preferably 10 to 50 μm. When the average thickness of the separator is less than 10 μm, the separator is too thin and thus the long-term durability of the separator may not be ensured due to repetitive bending and/or spreading of the battery, and when the average thickness of the separator is more than 100 μm, it is disadvantageous in a thin-welled flexible battery and thus the separator may have an average thickness in the range.

In addition, the nonwoven fabric layer has an average thickness of 10 to 30 and preferably 15 to 30 μm and the nanofiber web layer may have an average thickness of 1 to 5 μm.

The exterior material 120 is formed of a plate-shaped member having a predetermined area and receives the electrode assembly 110 and the electrolyte therein to protect the electrode assembly 110 from external force.

To this end, the exterior material 120 includes a pair of a first exterior material 121 and a second exterior material 122 and is sealed by an adhesive along with an edge to prevent the electrolyte and the electrode assembly 110 received therein from being exposed to the outside and prevent the electrolyte and the electrode assembly 110 from being leaked to the outside.

That is, the first exterior material 121 and the second exterior material 122 include a first region S1 forming a receiving part for receiving the electrode assembly and the electrolyte and a second region S2 disposed to surround the first region S1 and forming a sealing portion for preventing the electrolyte from being leaked to the outside.

The exterior material 120 is formed of two members of the first exterior material 121 and the second exterior material 122 and then all edge sides configuring the sealing portion may be sealed by the adhesive, and the exterior material 120 is formed of one member and a remaining part folded in half and contacted along with a width direction or longitudinal direction may be sealed by an adhesive.

The exterior material 120 may be provided to have metal layers 121b and 122b interposed between first resin layers 121a and 122a and second resin layers 121c and 122c. That is, the exterior material 120 is constituted in a form where the first resin layers 121a and 122a, the metal layers 121b and 122b, and the second resin layers 121c and 122c are sequentially laminated, and the first resin layers 121a and 122a are disposed at the inside to contact the electrolyte and the second resin layers 121c and 122c are exposed to the outside.

In this case, the first resin layers 121a and 122a serve as an adhesive member capable of preventing the electrolyte included in the battery from being leaked to the outside by sealing a space between the exterior materials 121 and 122. The first resin layers 121a and 122a may be a material of the adhesive member generally included in the exterior material for the battery, but preferably, may include one single-layer structure or a laminated structure of acid modified polypropylene (PPa), casting polyprolypene (CPP), linear low density polyethylene (LLDPE), low density polyethylene (LDPE), high density polyethylene (HDPE), polyethylene, polyethylene terephthalate, polypropylene, ethylene vinyl acetate (EVA), epoxy resin and phenol resin, and preferably, may be constituted by a single layer of one selected from of acid modified polypropylene (PPa), casting polypropylene (CPP), linear low density polyethylene (LLDPE), low density polyethylene (LDPE), and high density polyethylene (HDPE), or laminating at least two thereof.

In addition, the first resin layers 121a and 122a may have an average thickness of 20 μm to 80 μm and preferably 20 μm to 60 μm.

The reason is that when the average thickness of the first resin layers 121a and 122a is less than 20 μm, it is disadvantageous in securing airtightness for preventing adhesion between the first resin layers 121a and 122a contacting each other in a process of sealing the edge sides of the first exterior material 121 and the second exterior material 122 from being decreased or the electrolyte from being leaked, and when the average thickness is more than 80 μm, it is uneconomical and disadvantageous in thinning.

The metal layers 121b and 122b are interposed between the first resin layers 121a and 122a and the second resin layers 121c and 122c to prevent moisture from being penetrated to the receiving part side from the outside and prevent the electrolyte from being leaked from the receiving part to the outside.

To this end, the metal layers 121b and 122b may be formed of metal layers having a dense density to prevent moisture and the electrolyte from being transmitted. The metal layer may be formed by a foil-type metal thin film or a metal deposition film formed on the second resin layers 121c and 122c to be described below by a general known method, for example, a method such as sputtering and chemical vapor deposition and preferably, may be formed in a metal thin film. Accordingly, cracks of the metal layer are prevented when the patterns are formed to prevent the electrolyte from being leaked and the moisture from penetrating from the outside.

For example, the metal layers 121b and 122b may include at least one selected from aluminum, copper, phosphor-bronze (PB), aluminum bronze, cupronickel, beryllium-copper, chromium-copper, titanium-copper, iron-copper, a corson alloy and a chromium-zirconium copper alloy.

In this case, the metal layers 121b and 122b may have a linear expansion coefficient of $1.0\times10^{-7}$ to $1.7\times10^{-7}/°$ C. and preferably $1.2\times10^{-7}$ to $1.5\times10^{-7}/°$ C. The reason is that when the linear expansion coefficient is less than $1.7\times10^{-7}/°$ C., sufficient flexibility cannot be ensured and thus cracks may be generated by external force generated in the event of being bent, and when the linear expansion coefficient is more than $1.7\times10^{-7}/°$ C., stiffness is deteriorated and thus the shape may be severely deformed.

The metal layers 121b and 122b may have an average thickness of 5 μm or more, preferably 5μm to 100 μm and more preferably 30 μm to 50 μm.

The reason is that when the average thickness of the metal layer is less than 5 μm, moisture is penetrated to into the receiving part or the electrolyte in the receiving part may be leaked to the outside.

The second resin layers 121c and 122c are positioned on an exposure surface of the exterior material 120 to reinforce strength of the exterior material and prevent damage to the exterior material such as scratches from being generated by a physical contact applied to the outside.

The second resin layers 121c and 122c may include at least one selected from nylon, polyethylene terephthalate (PET), cycloolefin polymer (COP), polyimide (PI), and a fluorine-based compound and preferably nylon or the fluorine-based compound.

Herein, the fluorine-based compound may include at least one selected from Polytetrafluoroethylene (PTFE), perfluorinated acid (PFA), a fluorinated etheylene propylene copolymer (FEP), polyethylene tetrafluoroethylene (ETFE), polyvinylidene fluoride (PVDF), ethylene chlorotrifluoroethylene (ECTFE), and polychlorotrifluoroethylene (PCTFE).

In this case, the second resin layers 121c and 122c may have an average thickness of 10 μm to 50 μm, preferably 15 μm to 40 μm, and more preferably 15 μm to 35 μm.

The reason is that when the average thickness of the second resin layers 121c and 122c is less than 10 μm, a mechanical property may not be ensured, and when the average thickness is more than 50 μm, it is advantageous in ensuring the mechanical property, but is uneconomical and disadvantageous in thinning.

Meanwhile, the flexible batteries 100 and 100' according to the present invention may further include an adhesive layer between the metal layers 121b and 122b and the first resin layer 121a and 122a.

The adhesive layer serves to enhance adhesion between the metal layers 121b and 122b and the first resin layer 121a and 122a and prevent the electrolyte received in the exterior material from reaching the metal layers 121b and 122b of the exterior material, thereby preventing the metal layers 121b and 122b from being corroded with an acidic electrolyte and/or the first resin layer 121a and 122a and the metal layers 121b and 122b from being released. Further, while the flexible batteries 100 and 100' are used, problems such as overheating occur and even in the case where the flexible batteries are expanded, the electrolyte is prevented from being leaked to give reliability in safety.

The adhesive layer may be made of a similar material to the first resin layer 121a and 122a in order to improve adhesion according to compatibility with the first resin layer 121a and 122a. For example, the adhesive layer may include at least one selected from silicon, polyphthalate, acid modified polypropylene (PPa), and acid modified polyethylene (PEa).

In this case, the adhesive layer may have an average thickness of 5 μm to 30 μm and preferably 10 μm to 20 μm. When the average thickness of the adhesive layer is less than 5 μm, it is difficult to ensure stable adhesion and when the average thickness is more than 30 μm, it is disadvantageous in thinning.

Further, the flexible batteries 100 and 100' according to the present invention may further include a dry laminate layer between the metal layers 121b and 122b and the second resin layer 121c and 122c.

The dry laminate layer serves to adhere the metal layers 121b and 122b to the second resin layer 121c and 122c and may be formed by drying a known aqueous and/or oily organic solvent-adhesive.

In this case, the dry laminate layer may have an average thickness of 1μm to 7 μm, preferably 2 μm to 5 μm, and more preferably 2.5 μm to 3.5 μm.

The reason is that when the average thickness of the dry laminate layer is less than 1 μm, the release between the metal layers 121*b* and 122*b* and the second resin layers 121*c* and 122*c* may occur because adhesion is too weak, and when the average thickness is more than 7 μm, the thickness of the dry laminate layer is unnecessarily increased to have an adverse effect on forming patterns for contraction and extension Meanwhile, the electrolyte sealed in the receiving part together with the electrode assembly 110 may use a generally used liquid electrolyte.

For example, the electrolyte may use an organic electrolyte containing a non-aqueous organic solvent and a solute of a lithium salt. Herein, the non-aqueous organic solvent may use carbonate, ester, ether or ketone. The carbonate may use dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester may use butyrolactone (BL), decanolide, valerolactone, mevalonolactone, caprolactone, n-methyl acetate, n-ethyl acetate, n-propyl acetate, and the like, the ether may use dibutyl ether and the like, and the Ketone may use polymethylvinyl ketone, but the present invention is not limited to a kind of non-aqueous organic solvent.

Further, the electrolyte used in the present invention may include a lithium salt, and the lithium salt acts as a supply source of lithium ions in the battery to operate a basic lithium battery and for example, may include at least one selected from a group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (herein, x and y are rational numbers), and $LiSO_3CF_3$, or mixtures thereof.

In this case, the electrolyte used in the flexible batteries 100 and 100' according to the present invention may use a general liquid electrolyte, but preferably a gel polymer electrolyte to prevent gas exposure and liquid leakage which may be generated in the flexible battery including the liquid electrolyte in the event of being bent.

The gel polymer electrolyte may form a gel polymer electrolyte by gel-heating an organic electrolyte including a non-aqueous organic solvent and a lithium salt solute, a monomer for forming a gel polymer and a polymerization initiator. The gel polymer electrolyte may be implemented in a form in which a gel-stated polymer is impregnated in a pore of the separator 114 by heat-treating the organic electrolyte alone, but heat-treating the organic electrolyte impregnated in the separator in the flexible battery to in-situ polymerizing monomers. The in-situ polymerization in the flexible battery is performed by thermal polymerization, a polymerization time is approximately 20 minutes to 12 hours, and the thermal polymerization may be performed at 40 to 90° C.

In this case, the gel polymer forming monomer may use any monomers for forming a gel polymer while the polymerization is performed by a polymerizable initiator. For example, the gel polymer may exemplify methyl methacrylate (MMA), polyethylene oxide (PEO), polypropylene oxide (PPO), polyacrylonitrile (PAN), polyvinylidene fluoride (PVDF), polymethacrylate (PMA), polymethyl methacrylate (PMMA) or monomers for the polymers, or polyacrylate having two or more functional groups such as polyethylene glycol dimethacrylate and polyethylene glycol acrylate.

Further, examples of the polymerizable initiator include organic peroxides or hydroperoxides such as benzoyl peroxide, acetyl peroxide, dilauryl peroxide, di-tertbutylperoxide, cumyl hydroperoxide, hydrogen peroxide, azo compounds such as 2,2-azobis(2-cyanobutane), 2,2-azobis (methylbutyronitrile), and the like. The polymerizable initiator is decomposed by a heat to form a radical and reacts with monomers by free radical polymerization to form a gel polymer electrolyte, that is, a gel polymer.

It is preferred that the monomers for forming the gel polymer are used with 1 to 10 wt % with respect to the organic electrolyte. When the content of monomers is less than 1, it is difficult to form a gel type electrolyte and when the content thereof is more than 10 wt %, there is a problem in deterioration of a life-span. Further, the polymerizable initiator may be included 0.01 to 5 wt % with respect to the monomers for forming the gel polymer.

Figure 12:
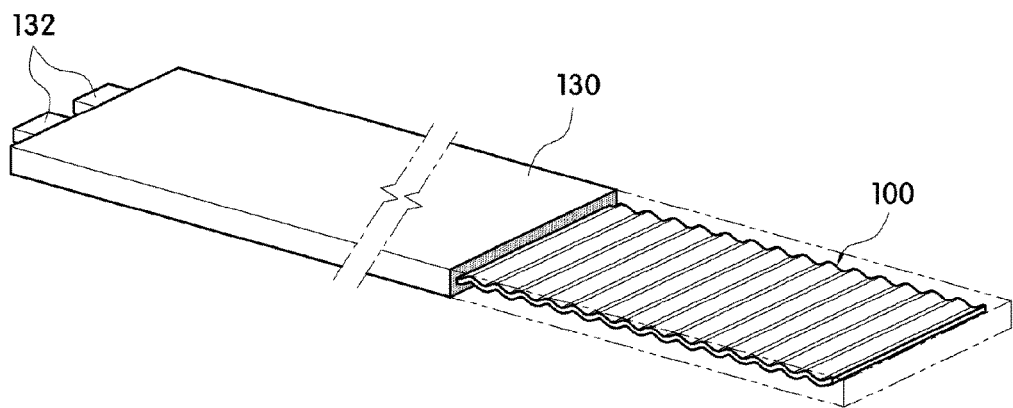
FIG. 12 is a schematic diagram illustrating a form implemented as an auxiliary battery where the flexible battery according to the embodiment of the present invention is embedded in a housing.

Meanwhile, the flexible battery 100 according to an embodiment of the present invention includes a housing 130 covering the surface of the exterior material 120 as illustrated in FIG. 12, and the housing 130 includes at least one terminal portion 132 for electric connection with a device to be charged to be implemented in a form of an auxiliary battery. Herein, the housing 130 may be made of a rigid material such as plastic or metal, but may be used as a flexible soft material such as silicon or leather.

Herein, the auxiliary battery is implemented by accessories such as bracelets and braces, a watch strap, and the like to be used as fashion products if charging of the device to be charged is unnecessary and is electrically connected with the device to be charged through the terminal portion 132 if the charging of the device to be charged is necessary to charge a main battery of the device to be charged regardless of location.

Herein, it is illustrated that a pair of terminal portions 131 is included at an end of the housing 130, but is not limited thereto, and the terminal portions 131 may be provided at the side of the housing 130 and formed at various positions such as an upper surface or a lower surface of the housing. Further, the terminal portion 131 may be provided in a separated form of a negative electrode terminal and a positive electrode terminal and provided in a combined form of the positive electrode and the negative electrode such as USB and the like.

Further, the flexible battery of the present invention may be used as a main battery or an auxiliary battery of an electric and/or electronic device requiring flexibility. For example, it is determined that the flexible battery according to the present invention may be widely used for electronic devices such as a watch strap of a smart watch, a flexible display, and the like.

Meanwhile, the flexible battery 100 according to the present invention may be manufactured by simultaneously pressurizing the electrode assembly 110 and the exterior material 120 while the electrode assembly 110 is sealed in the exterior material 120 to form the patterns 119 and 124 for contraction and extension to match each other in the electrode assembly 110 and the exterior material 120.

For example, a flat flexible battery passes between a pair of rollers with a predetermined pattern formed on an outer circumference to form the patterns 119 and 124. Herein, in the pair of rollers, trough portions and crest portions configuring the patterns 119 and 124 are alternately formed along the outer circumference and the crest portions formed on one roller are engaged with the trough portions formed on the other roller when engaging.

Figure 13:
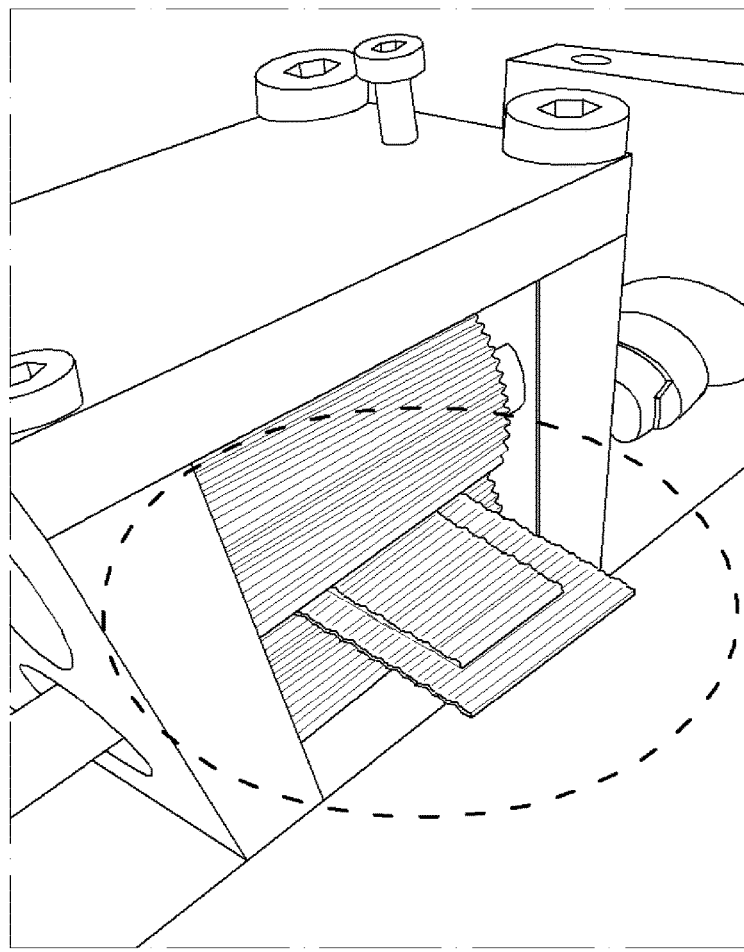
FIG. 13 is a photograph of a device used in a method of forming patterns in the flexible battery according to the embodiment of the present invention and a flexible battery manufactured by the device.

As a result, when the flat flexible battery passes between a pair of rollers, the electrode assembly 110 and the exterior material 120 are simultaneously pressurized by the pair of rollers, and thus the crest portions and the trough portions are alternately and continuously formed along with the longitudinal direction and the patterns which match each other in the electrode assembly 110 and the exterior material 120 are formed (see FIG. 13).

Herein, the electrolyte sealed by the exterior material 120 together with the electrode assembly 110 may be injected into the exterior material 120 after passing rough the pair of rollers to form the patterns or may be injected into the exterior material 120 before passing through the pair of rollers.

However, the method for manufacturing the flexible battery according to the present invention is not limited thereto, and the flexible battery may be manufactured by a method of forming the first pattern 124 and the second pattern 119 on the exterior material 120 and the electrode assembly 110 and then bonding the first pattern 124 and the second pattern 119 to match each other.

EXAMPLES

Example 1

First, a metal layer having a thickness of 30 µm and made of an aluminum material was prepared, a first resin layer having a thickness of 40 µm and made of casting polypropylene (CPP) was formed on one surface of the metal layer, and a second resin layer having a thickness of 10 µm and formed of a nylon film was formed on the other surface of the metal layer. In this case, an acid-modified polypropylene layer containing 6 wt % of the content of acrylic acid in an acid-modified polypropylene copolymer was interposed between the first resin layer and the metal layer with 5 µm to manufacture an exterior material having a total thickness of 85 µm.

Next, in order to manufacture an electrode assembly, first, a positive electrode assembly and a negative electrode assembly were prepared. The positive electrode assembly was manufactured by casting a lithium-nickel-cobalt-manganese (NCM)-based positive electrode active material on both surfaces of a positive electrode current collector having a thickness of 20 µm and made of aluminum to have a final thickness of 120 µm. Further, the negative electrode assembly was manufactured by casting a graphite negative electrode active material on both surfaces of a negative electrode current collector having a thickness of 15 µm and made of copper to have a final thickness of 115 µm. Thereafter, a separator made of PET/PEN and a thickness of 20 µm was prepared and an electrode assembly including three positive electrode assemblies, six separators, and four negative electrode assemblies was manufactured by alternately laminating the positive electrode assemblies, the separators, and the negative electrode assemblies.

Thereafter, a first resin layer of the prepared exterior material was folded to be an inner surface and then the folded first resin layer of the exterior material was disposed at the inside of the exterior material to contact the electrode assembly, and only a part which may be injected with the electrolyte was left and thermally pressed at a temperature of 150° C. for 10 seconds. Thereafter, an electrolyte for a general lithium-ion secondary battery was injected to one part and the part injected with the electrolyte was thermally pressed at the temperature of 150° C. for 10 seconds to manufacture a battery. Thereafter, the battery was inserted to a manufacturing device illustrated in FIG. 13 to form wave patterns illustrated in FIG. 8 and manufacture a flexible battery having an increased surface area ratio (Sdr) of 12.524 according to Equation 1 and θ of 26.224° according to Equation 2 as illustrated in Table 3 below. A detailed specification for the manufactured flexible battery is as illustrated in Table 1 below.

TABLE 1

| Cross-section thickness (mm) | 1.1 ± 0.5 |
| Width (mm) | 26.0 ± 2.0 |
| Length (mm, except for outer protruding terminal portion) | 84.0 ± 2.0 |
| Weight (g) | 4.7 ± 0.5 |
| Nominal capacity (mAh) | 135 |
| Nominal voltage (V) | 3.7 |

Examples 2 To 12

A flexible battery in Examples 2 to 12 was implemented the same as Example 1 and manufactured by changing an increased surface area ratio of patterns included in the battery and the like as illustrated in Table 3 or 4 below.

In this case, in Example 12, the positive electrode assemblies, the separators, and the negative electrode assemblies were changed into 5 positive electrode assemblies, 10 separators, and 6 negative electrode assemblies to manufacture the flexible battery and in the manufactured flexible battery, a normal capacity was 530 mAh and normal voltage was 3.7 V.

Comparative Example 1

Figure 14:
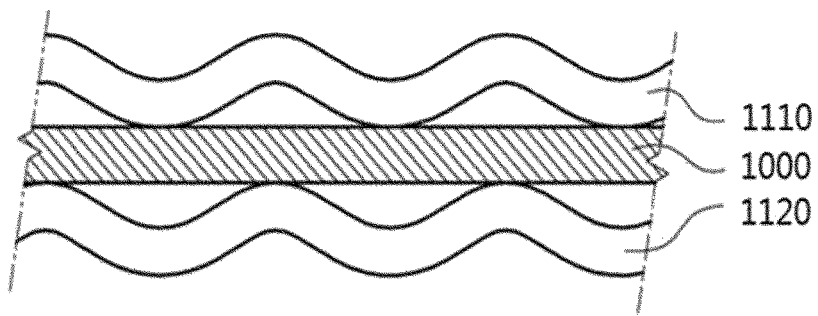
FIG. 14 is a cross-sectional schematic diagram illustrating the flexible battery according to the embodiment of the present invention.

Comparative Example 1 was implemented the same as Example 1 and patterns were formed by inserting only the prepared exterior material to the manufacturing device illustrated in FIG. 13 (1100). Thereafter, an electrode assembly 1000 without the patterns was sealed by the exterior material with the patterns to manufacture a flexible battery illustrated in Table 5 below having a cross-sectional structure illustrated in FIG. 14.

Comparative Example 2

Comparative Example 2 was implemented the same as Example 1 and the patterns were not formed on the exterior material and the electrode assembly of the battery to manufacture a flexible battery illustrated in Table 4 below having a shape illustrated in FIG. 1.

Comparative Examples 3 and 4

Comparative Examples 3 and 4 were implemented the same as Example 1 and a flexible battery was manufactured by changing an increased surface area ratio of patterns included in the battery as illustrated in Table 5 below.

Experimental Example

The following physical properties of the manufactured flexible battery were evaluated and then illustrated in Tables 3 to 5.

1. Whether to Satisfy Equations 1 and 2

After whether to satisfy Equations 1 and 2 below was verified, when it was satisfied, it was indicated as ○ and when it was unsatisfied, it was indicated as x.

$$\text{Increased surface area ratio}(Sdr) = \frac{\text{surface area of one region with pattern} - Lx \times Ly}{Lx \times Ly} \times 100 \quad \text{[Equation 1]}$$

$$\theta(°) = \tan^{-1}\left(\frac{2h}{p}\right) \quad \text{[Equation 2]}$$

2. Evaluation of Charge Efficiency in Bent State

In the event of being bent to have a curvature of 25 mm at a part bent by applying force to both ends of the fully discharged flexible battery in an environment of a temperature of 25° C. and a humidity of 65%, the flexible battery was fully charged to measure a charge capacity and then fully discharged again, and an average charge capacity was measured by implementing a recharging process 100 times. However, when the charge capacity before 100 times was 0 mAh, an average of the charge capacities measured until measured to initial 0 mAh was calculated.

In this case, charge and discharge conditions were illustrated in Table 2 below.

TABLE 2

| Charge condition | Normal Current | 0.2 C |
|---|---|---|
| | Max. Current | 0.5 C |
| | CC-CV | 4.2 V |
| | Cut-Off | 0.05 C |

TABLE 2-continued

| Discharge condition | Normal Current | 0.2 C |
|---|---|---|
| | Max. Current | 0.5 C |
| | Cut-off Voltage | 2.8 V |

3. Durability

Bending and restoring to the original state of the flexible battery were set to 1 set and performed by 500 sets, and then an appearance of the battery was observed by an optical microscope to evaluate whether appearance abnormality such as a leakage of the electrolyte and a fine crack in the exterior material occurred. As the evaluated result, when there was no abnormality, it was evaluated to 0 and when the abnormal degree was severe, it was evaluated to 1 to 5.

4. Evaluation of Whether to Exhibit Battery Performance After Fully Folding

In an environment of a temperature of 25° C. and a humidity of 65%, a fully charged flexible battery was folded at a ½ point in a longitudinal direction of the battery and fully folded by apply a load of 0.8 kN/24 cm² (=26 mm×91.5 mm) by Hydraulic Ram, and then unfolded again, and thereafter, voltage was measured for 120 seconds and voltage at 120 seconds after measuring was illustrated in Table.

5. Whether Noise Occurs

While repeating bending and restoring of the flexible battery, whether creak noise occurred was evaluated, and when there was no noise, it was indicated to 0, and as the occurrence of the noise was severe and/or as the number of occurrence times was increased, it was indicated to 1 to 5.

TABLE 3

| | | Example 1 | Example 2 | Example 3 | Example 4 | Example 5 | Example 6 | Example 7 |
|---|---|---|---|---|---|---|---|---|
| Flexible battery | Thickness (mm) | 1.1 | 1.1 | 1.1 | 1.1 | 1.1 | 1.1 | 1.1 |
| | Lx (mm) | 74.935 | 82.820 | 81.585 | 79.546 | 76.890 | 72.315 | 71.566 |
| | Ly (mm) | 26 | 26 | 26 | 26 | 26 | 26 | 26 |
| | Lx' (mm) | 84.32 | 84.32 | 84.32 | 84.32 | 84.32 | 84.32 | 84.32 |
| | Ly' (mm) | 26 | 26 | 26 | 26 | 26 | 26 | 26 |
| | Increased surface area ratio (%) | 12.524 | 1.811 | 3.352 | 6.002 | 9.663 | 16.6 | 17.822 |
| | Whether to satisfy Equation 1 | ○ | ○ | ○ | ○ | ○ | ○ | ○ |
| | Pitch (mm) | 4.074 | 4.173 | 4.196 | 4.029 | 4.055 | 4.009 | 4.01 |
| | Height (mm) | 1.052 | 0.489 | 0.67 | 0.722 | 0.888 | 1.126 | 1.116 |
| | Angle (°) | 26.224 | 12.764 | 18.271 | 20.936 | 23.526 | 28.093 | 29.969 |
| | Whether to satisfy Equation 2 | ○ | ○ | ○ | ○ | ○ | ○ | ○ |
| Property | Average charge capacity (mAh) | 116.8 | 101.1 | 106.7 | 116.3 | 115.6 | 116.2 | 116.5 |
| | Durability | 0 | 2 | 1 | 0 | 0 | 0 | 0 |
| | Performance after folding (V) | 4.2 | 3.5 | 3.4 | 4.2 | 4.2 | 4.2 | 4.2 |
| | Occurrence of noise | 0 | 0 | 0 | 0 | 0 | 0 | 0 |

TABLE 4

|  |  | Example 8 | Example 9 | Example 10 | Example 11 | Example 12 |
|---|---|---|---|---|---|---|
| Flexible battery | Thickness (mm) | 1.1 | 1.1 | 1.1 | 1.1 | 1.6 |
|  | Lx (mm) | 70.170 | 69.825 | 68.644 | 65.628 | 85.070 |
|  | Ly (mm) | 26 | 26 | 26 | 26 | 26 |
|  | Lx' (mm) | 84.32 | 84.32 | 84.32 | 84.32 | 88.7 |
|  | Ly' (mm) | 26 | 26 | 26 | 26 | 26 |
|  | Increased surface area ratio (%) | 20.165 | 20.759 | 22.836 | 28.482 | 4.267 |
|  | Whether to satisfy Equation 1 | ○ | ○ | ○ | ○ | ○ |
|  | Pitch (mm) | 4.07 | 4.137 | 4.124 | 4.135 | 1.13 |
|  | Height (mm) | 1.148 | 1.153 | 1.172 | 1.506 | 0.134 |
|  | Angle (°) | 29.497 | 29.999 | 31.758 | 38.255 | 13.342 |
|  | Whether to satisfy Equation 2 | ○ | ○ | ○ | ○ | ○ |
| Property | Average charge capacity (mAh) | 116.2 | 116.3 | 115.4 | 110.1 | 512.5 |
|  | Durability | 0 | 0 | 1 | 2 | 0 |
|  | Performance after folding (V) | 4.2 | 4.2 | 4.0 | 3.9 | 4.2 |
|  | Occurrence of noise | 0 | 0 | 1 | 3 | 0 |

TABLE 5

|  |  | Com. Example 1 | Com. Example 2 | Com. Example 3 | Com. Example 4 |
|---|---|---|---|---|---|
| Flexible battery | Thickness (mm) | 1.1 | 1.1 | 1.1 | 1.1 |
|  | Lx (mm) | 74.935 | 84.32 | 59.23 | 83.84 |
|  | Ly (mm) | 26 | 26 | 26 | 26 |
|  | Lx' (mm) | 84.32 | 84.32 | 84.32 | 84.32 |
|  | Ly' (mm) | 26 | 26 | 26 | 26 |
|  | Increased surface area ratio (%) | 12.524 | 0 | 42.361 | 0.482 |
|  | Whether to satisfy Equation 1 | ○ | X | X | X |
|  | Pitch (mm) | 4.074 | 0 | 3.439 | 5.102 |
|  | Height (mm) | 1.052 | 0 | 1.856 | 0.214 |
|  | Angle (°) | 26.224 | 0 | 47.186 | 4.795 |
|  | Whether to satisfy Equation 2 | ○ | X | X | X |
| Property | Average charge capacity in bent state (mAh) | 36.53 | 19.25 | 78.6 | 43.63 |
|  | Durability | 5 | 5 | 5 | 4 |
|  | Performance after fully folding (V) | 2.3 | 1.0 | 3.2 | 2.6 |
|  | Occurrence of noise | 0 | 0 | 5 | 0 |

* In Comparative Example 1, a pitch, a height, an angle, and an increased surface area ratio are specifications for the exterior material in the flexible battery and the pattern is not formed on the electrode assembly.

In detail, as verified in Tables 3 to 5, even in the case where sealed by an exterior material satisfying a range according to the present invention of an increased surface area ratio of the pattern, in Comparative Example 1 without patterns on the electrode assembly, it was verified that an average charge capacity and durability in the bent state were significantly reduced compared to Example 1 and it was unsuitable for the flexible battery. Particularly, as verified in FIG. 11A, it was verified that battery performance was lost after charging and discharging about 56 times and it may be expected to be lost by breakage of the electrode assembly.

Further, in Comparative Example 2 without patterns on the exterior material and the electrode assembly, it can be verified that an average charge capacity in the bent state is significantly low compared to Example 1 and durability is significantly deteriorated. As verified in FIG. 11A, it can be verified that a battery function after charging and discharging about 30 times is fully lost and there is no durability.

Further, in the case of Comparative Examples 3 and 4 in which patterns included in the flexible battery do not satisfy an increased surface area ratio according to the present invention, it can be verified that an average charge capacity in the bent state of the battery, durability, performance after full folding and/or prevention of noise occurrence are significantly deteriorated compared to Example 1. However, in Comparative Example 3, it can be verified that as a height of the pattern is large and a pitch of the pattern is small compared to Example 1, flexibility is good, but a creak sound is large, and a charge capacity is significantly reduced according to a damage of the electrode assembly by forming excessive patterns.

Meanwhile, it can be verified that in Examples 1 and 3 to 10 which satisfy a more preferred increased surface area ratio of the present invention of 3.0 to 23.0 among Examples, physical properties are excellent compared to Examples 2 and 11.

Further, even in the case of Example 12 in which a thickness of the flexible battery is increased compared to Example 1 by increasing the number of electrode assemblies, it can be verified that excellent flexibility and durability are expressed and noise is not generated by satisfying an increased surface area ratio of the present invention.

While this invention has been described in connection with what is presently considered to be practical exemplary embodiments, it is to be understood that the invention is not limited to the disclosed embodiments, but, on the contrary, is intended to cover various addition, modifications, deletion, supplement and equivalent arrangements included within the spirit and scope of the appended claims.

The invention claimed is:

1. A flexible battery comprising: an electrode assembly; and an exterior material for sealing the electrode assembly with an electrolyte,
wherein the electrode assembly and the exterior material are formed so that patterns for contraction and extension with respect to a longitudinal direction have the same directionality in the event of being bent, and a region with the patterns includes a region in which an increased surface area ratio (Sdr) according to Equation 1 below satisfies 0.5 to 40.0:

$$\text{Increased surface area ratio}(Sdr) = \frac{\text{surface area of one region with pattern} - Lx \times Ly}{Lx \times Ly} \times 100,\quad \text{[Equation 1]}$$

and wherein a surface area of one region with the patterns is a surface area based on one region of the battery in which a horizontal length is Lx (mm) and a vertical length is Ly (mm).

2. The flexible battery of claim 1, wherein the patterns includes a first pattern formed on at least one surface of the exterior material and a second pattern formed on the electrode assembly in the same direction as the first pattern, and the first pattern and the second pattern are disposed to be matched with each other.

3. The flexible battery of claim 1, wherein in the pattern, a plurality of crest portions and trough portions are alternately formed in a longitudinal direction and the crest portion and trough portion are provided to have an arc-shaped cross-section, a polygonal cross-section, and a combined cross-section thereof.

4. The flexible battery of claim 3, wherein the crest portions and trough portions are continuously or discontinuously formed in a parallel direction with a width direction of the electrode assembly and the exterior material, respectively.

5. The flexible battery of claim 3, wherein the patterns are entirely or partially formed on the electrode assembly and the exterior material.

6. The flexible battery of claim 3, wherein a distance between adjacent crest portions or a distance between adjacent trough portions is formed to have an equal distance or an unequal distance or provided in a form combined with the equal distance and the unequal distance.

7. The flexible battery of claim 1, wherein the patterns are continuously or discontinuously formed along the longitudinal direction.

8. The flexible battery of claim 1, wherein the exterior material includes a first region for forming an accommodating portion that accommodates the electrode assembly and an electrolyte and a second region disposed to surround the first region to form a sealing portion, and the pattern formed on the exterior material of the patterns is formed only in the first region.

9. The flexible battery of claim 1, wherein a cross-sectional thickness of the battery is 0.2 to 5 mm.

10. The flexible battery of claim 1, wherein an increased surface area ratio (Sdr) according to Equation 1 is 3.0 to 23.0.

11. The flexible battery of claim 1, wherein the electrode assembly includes a positive electrode and a negative electrode constituted by coating an active material on a part or the entire of a current collector and a separator disposed between the positive electrode and the negative electrode, and the separator includes a porous nonwoven layer having fine pores and a nanofiber web layer containing a polyacrylonitrile nanofiber on one surface or both surfaces of the nonwoven layer.

12. The flexible battery of claim 11, wherein the active material includes PTFE to prevent cracks and releasing from the current collector.

13. The flexible battery of claim 1, wherein in the exterior material, a first resin layer, a metal layer and a second resin layer are sequentially laminated and the second resin layer is exposed to the outside, wherein the first resin layer is formed in a single layer of one kind selected from acid modified polypropylene (PPa), casting polypropylene (CPP), linear low density polyethylene (LLDPE), low density polyethylene (LDPE), high density polyethylene (HDPE), polyethylene terephthalate, polypropylene, ethylene vinyl acetate (EVA), an epoxy resin and a phenol resin or by laminating two kinds or more thereof, wherein the metal layer includes at least one selected from aluminum, copper, phosphorbronze (PB), aluminum bronze, copper-nickel, beryllium-copper, chromium-copper, titanium-copper, iron-copper, a corson alloy and a chromium-zirconium copper alloy, and wherein the second resin layer includes at least one selected from nylon, polyethylene terephthalate (PET), cycloolefin polymer (COP), polyimide (PI), and a fluorine-based compound.

14. The flexible battery of claim 13, wherein an adhesive layer is disposed between the metal layer and the first resin layer and the adhesive layer includes at least one selected from silicon, polyphthalate, acid modified polypropylene (PPa) or acid modified polyethylene (PEa).

15. The flexible battery of claim 1, wherein the electrolyte includes a gel polymer electrolyte.

16. A flexible battery comprising: an electrode assembly; and an exterior material for sealing the electrode assembly along with an electrolyte, wherein the electrode assembly and the exterior material are formed so that patterns for contraction and extension with respect to a longitudinal direction have the same directionality in the event of being bent, and a region with the patterns includes a region in which θ according to Equation 2 below satisfies 5.0° to 47°:

$$\theta(°) = \tan^{-1}(2h/p) \quad \text{[Equation 2]}$$

wherein h is an average vertical distance (mm) between the top and the bottom of adjacent crests and troughs in the pattern formed in the flexible battery and p is an average horizontal distance (mm) between the tops of two adjacent crests.

17. The flexible battery of claim 16, wherein a region with the patterns includes a region satisfying θ of 5.0° to 31° according to Equation 2.

18. An auxiliary battery comprising:

a flexible battery of claim 1; and a soft housing covering the surface of the exterior material, wherein the housing includes at least one terminal portion for electric connection with a device to be charged.

19. A method for manufacturing a flexible battery in which an electrode assembly is sealed by an exterior material together with an electrolyte, wherein the electrode assembly and the exterior material include patterns for contraction and extension with respect to the longitudinal direction in the event of being bent, respectively, the patterns are formed by matching the pattern formed on the electrode assembly and the pattern formed on the exterior material with each other and simultaneously pressurizing the electrode assembly and the exterior material so that an increased surface area ratio (Sdr) according to Equation 1 below satisfies 0.5 to 40.0:

$$\text{Increased surface area ratio}(Sdr) = \frac{\text{surface area of one region with pattern} - Lx \times Ly}{Lx \times Ly} \times 100 \quad \text{[Equation 1]}$$

wherein, a surface area of one region with the patterns is a surface area based on one region of the battery in which a horizontal length is Lx (mm) and a vertical length is Ly (mm).

20. A mobile electronic device including the auxiliary battery of claim 18.

* * * * *